Oct. 24, 1967

F. R. ROSE 3,348,858

OUTDOOR SPORTING EQUIPMENT INCLUDING A WHEEL
MOUNTED BOAT ASSEMBLY

Filed May 10, 1965

INVENTOR
FLOYD R. ROSE

BY Roy A. Plant

ATTORNEY

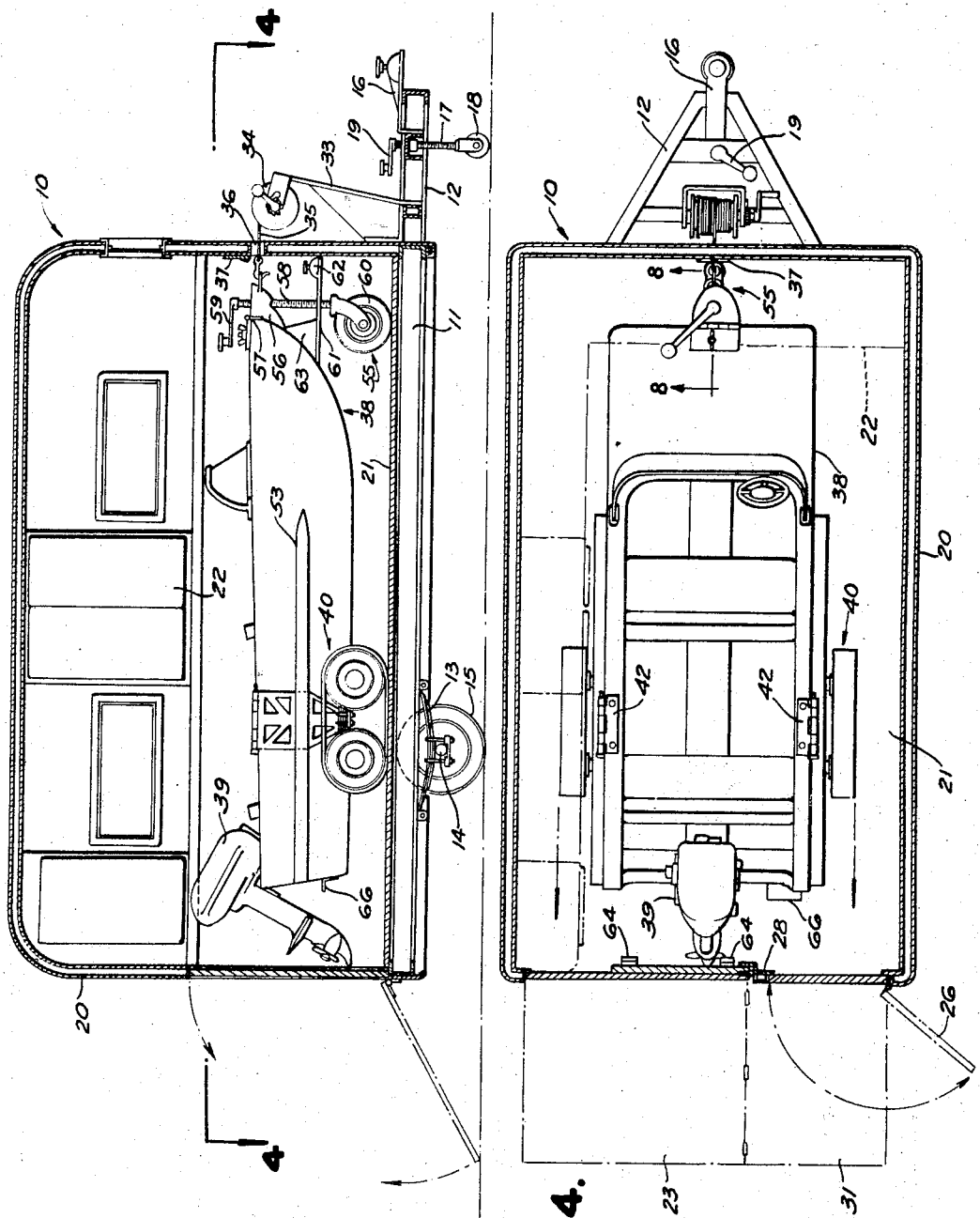

Oct. 24, 1967  F. R. ROSE  3,348,858
OUTDOOR SPORTING EQUIPMENT INCLUDING A WHEEL
MOUNTED BOAT ASSEMBLY
Filed May 10, 1965  4 Sheets-Sheet 3
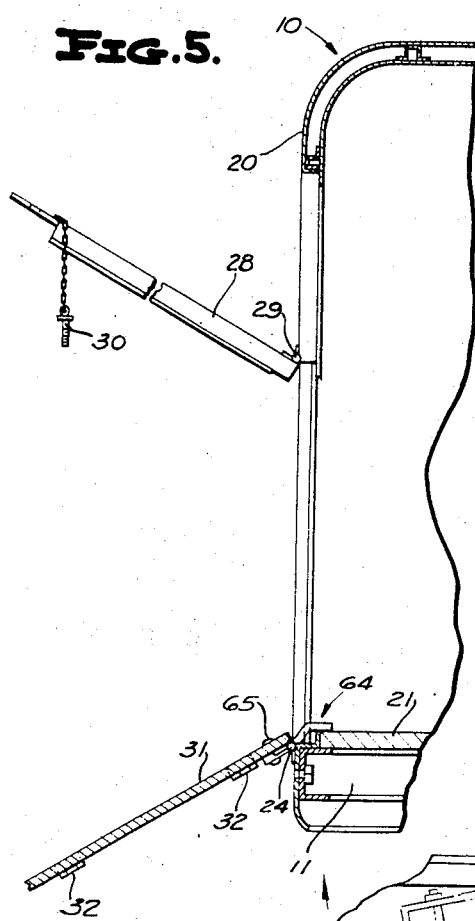
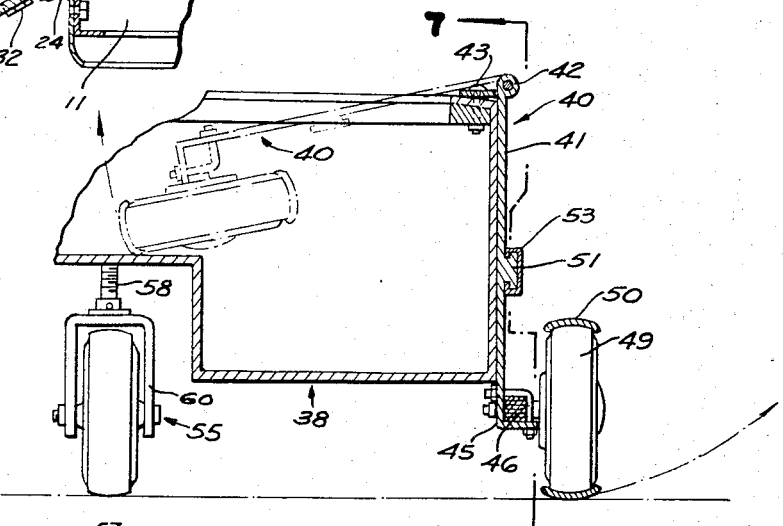
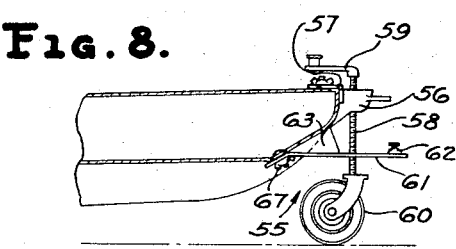
INVENTOR
FLOYD R. ROSE
BY Roy A. Plant
ATTORNEY

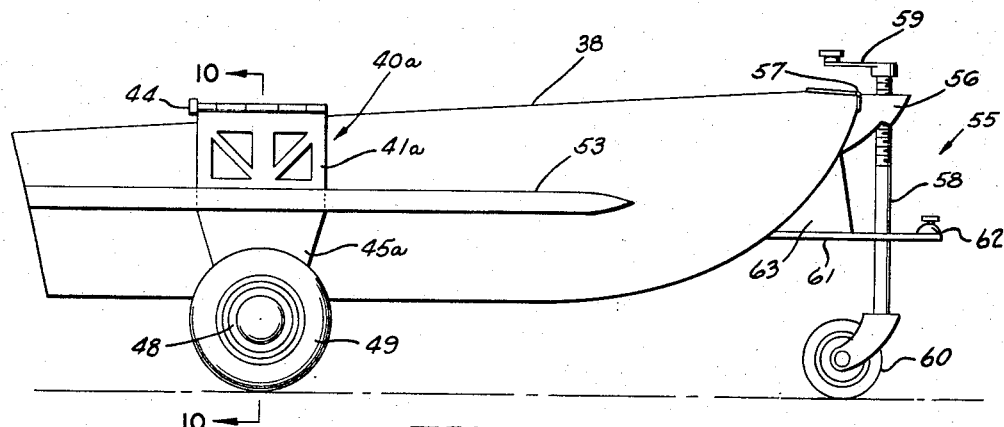

United States Patent Office 3,348,858
Patented Oct. 24, 1967

3,348,585
OUTDOOR SPORTING EQUIPMENT INCLUDING
A WHEEL MOUNTED BOAT ASSEMBLY
Floyd R. Rose, 220 Virginia, Battle Creek, Mich. 49017
Filed May 10, 1965, Ser. No. 454,486
8 Claims. (Cl. 280—43.2)

The present application is a division with new matter added, thus making it a continuation-in-part of my co-pending U.S. patent application Ser. No. 142,382, filed Oct. 2, 1961 and now U.S. Patent 3,193,321, with the invention set forth herein relating in general to new and useful improvements in outdoor sporting equipment, and more specifically to a wheeled boat assembly which may be used either alone or in combination with a novel mobile home or house trailer as hereinafter set forth.

Vacation at one time was done, in connection with outdoor camping, by means of a tent, and as far as a boat was concerned, it would normally be rented in the area where the camping took place. There has been a great change in habits since that time in that most people no longer do as much tenting, and the trend for campers is to either have foldable camp trailers or house trailers of the traveling trailer type. Also, most campers now own their own boats and desire to take the boats along with them. Since the boat cannot be towed behing a camp trailer or a house trailer, it is necessary normally that the boat either be stored on top of the towing automobile or on top of the trailer. The latter is highly undesirable because of the height, and storing a boat on the top of a modern automobile is also generally undesirable. With respect to the storage of the boat on top of the automobile, it is extremely awkward and difficult for one to either mount or remove the boat from the top of an automobile without a winch. Secondly, because of the fact that the passenger compartment roof portion of the modern day automobile is relatively short, only limited facilities are provided for supporting a boat, thereby greatly limiting the length of the boat which can be supported. It was a recognition of these shortcomings in the camping and sporting equipment field, and the complete lack of any commercially acceptable equipment of the house trailer and boat type on the market, which led to the conception and development of the present invention.

Accordingly, among the objects of the present invention is the provision of a novel boat and house trailer combination wherein the house trailer is of a construction so that a boat of the type herein described may be readily stored on the floor of the house trailer without any loss of living space within the trailer when the boat is removed therefrom, and even permitting living in the house trailer, less conveniently, even with the boat inside of same.

Another object of this invention is to provide a novel boat and house trailer combination wherein the house trailer is adapted to receive a boat of the present type, the house trailer having at least certain of the furnishings thereof elevated so as to clear the boat.

Another object of this invention is to provide a novel wheel mounted boat and house trailer combination wherein the house trailer is adapted for receiving and carrying a boat of the present type, the house trailer being provided with a rear exit door for the boat, the door having a bottom horizontal hinge so that the same may swing rearwardly and downwardly and function as a ramp for use in loading and unloading the wheel mounted boat with respect to the house trailer.

Still another object of this invention is to provide a novel boat and house trailer combination with said house trailer having means for carrying a boat of the present type within the interior thereof, the house trailer being constructed with a major portion of the furnishings thereof elevated above the height of the boat so that the boat may fit beneath the furnishings of the trailer and thereby a relatively wide and long boat of the present wheel mounted type may be stored within the trailer, the trailer further being provided with a novel winch arrangement wherein the winch is disposed forwardly of the housing portion of the trailer and having a cable which extends through a small opening in the front of the trailer and extends through the rear thereof, whereby a wheel mounted boat may be readily loaded and unloaded with respect to the trailer body utilizing the winch and cable.

A further object of this invention is to provide a novel wheel mounted boat which is particularly adapted for carrying within a trailer, the boat being provided with hinged wheel supports which may be readily swung into the boat when the boat is in the water, whereby the boat may be readily launched from within the trailer and later removed from the water, the wheels returned to supporting position, and the boat returned on its wheels to its stored position within the trailer.

Another object of this invention is to provide a novel boat construction wherein the rear portion of the boat is supported by wheels carried by hingedly mounted supports, the supports being swingable to positions within the boat for convenience of storage during use of the boat in water, the wheels at opposite sides of the boat being either single wheels, or if desired being in the form of tandem rear wheels, said boat also including a front wheel wherein the boat is entirely supported by wheels for travel on the land.

Another object of this invention is to provide a novel wheel support for a boat wherein the boat hull has a spray rail along each side thereof and the rear wheel assembly support at each side of the boat is hinged to the top portion of the side of the boat and preferably includes a ribbed portion aligned with the spray rail of the boat, the spray rail having a portion engaging over the ribbed portion of the wheel support to hold the wheel support firmly in place alongside the side of the boat when the latter is to be mounted for movement on said wheel assembly.

A still further object of this invention is to provide a novel front wheel assembly and tow hitch arrangement for a boat, the front wheel assembly and tow hitch including an upper bracket pivotally connected to the bow of the boat for swinging movement into the interior of the boat, and a lower bracket carrying the tow hitch and being clampable beneath the upwardly curving bow of the boat, the tow hitch being movable with the upper bracket to a generally stored position on the bow portion of the boat when the latter is to be used in water.

Still another object of this invention is to provide a novel wheel assembly for supporting the rear portion of the boat combination in sandy and other types of ground, the wheel assembly including tandem wheels with the tire of each wheel preferably being slightly crowned, and preferably with a removable, endless, load supporting belt being engaged over the two wheels of the tandem wheels to increase the load bearing capacity of said tandem wheels.

Yet another object of this invention is to provide a novel boat and house trailer combination having special facilities for storing a wheel mounted boat on the floor thereof, the house trailer being provided with a rear boat exit door which is relatively low as compared to an adjacent personnel door, the trailer also including a removable door frame between the two doors, and the boat exit door having a pivotally mounted side extension which is swingable sidewise into a wheeled boat supporting position after the boat exit door has been lowered and which thus forms a ramp which is substantially as long as the full width of the trailer at the rear end thereof and adapted to support the wheel mounted boat of the present invention when same is moved into or out of said trailer.

Still further objects and advantages of the invention will appear as the description proceeds.

To the accomplishment of the foregoing and related ends, the invention, then, consists of the sporting equipment hereinafter fully described and particularly pointed out in the claims, the annexed drawings and the following description setting forth in detail certain means for carrying out the invention, such disclosed means illustrating, however, but several of various ways in which the principle of the invention may be used.

In the annexed drawings:

FIGURE 1 is a rear perspective view of a house trailer adapted to receive and carry a wheeled boat formed in accordance with the present invention.

FIGURE 2 is a rear perspective view showing the house trailer of FIGURE 1 with the rear doors thereof open and a wheel mounted boat in position to be loaded within the trailer, one general arrangement of certain of the cupboards and counter furnishings within the trailer being shown in dotted lines.

FIGURE 3 is a longitudinal vertical sectional view on a larger scale as taken along the line 3—3 of FIGURE 1, looking in the direction of the arrows, and shows one typical layout of the interior of the trailer, with the wheel mounted boat stored therein.

FIGURE 4 is a horizontal sectional view as taken along the line 4—4 of FIGURE 3, looking in the direction of the arrows, and further shows the details of construction of the wheel mounted boat and trailer combination, and the relationship of the wheel mounted boat in said trailer.

FIGURE 5 is an enlarged fragmentary vertical sectional view as taken through the rear of the trailer along the line 5—5 of FIGURE 2, looking in the direction of the arrows, and shows the specific details of a preferred form of the trailer door construction over which the wheel mounted boat may be moved.

FIGURE 6 is an enlarged fragmentary transverse vertical sectional view as taken along the line 6—6 of FIGURE 2 through the boat, looking in the direction of the arrows, and shows the specific details of a preferred form of the wheel support for the boat, the wheel support being shown in a stored position within the boat by phantom lines.

FIGURE 7 is an enlarged fragmentary vertical sectional view as taken along line 7—7 of FIGURE 6, looking in the direction of the arrows, and shows further the details of the construction of the wheel support including the details of the spring assembly for holding the removable spray rail which is utilized for holding the wheel support, which may include tandem wheels, in a boat supporting position.

FIGURE 8 is a fragmentary vertical sectional view showing the details of mounting the front wheel assembly on the boat, as seen along line 8—8 of FIGURE 4, looking in the direction of the arrows.

FIGURE 9 is an enlarged side view of a modified form of the boat shown in FIGURES 2, 3 and 4, omitting the showing of the outboard motor and windshield while illustrating the use of a single rear wheel mounted on a hinged support bracket for swinging into the boat in similar manner to that diagrammatically illustrated in FIGURE 6, the opposite side of the boat having a like form of wheel mounting assembly.

FIGURE 10 is a fragmentary transverse sectional view as taken along line 10—10 of FIGURE 9, looking in the direction of the arrows.

FIGURE 11 shows an enlarged fragmentary sectional view similar to FIGURE 10, and which illustrates a modification wherein the wheel assembly is resiliently mounted.

FIGURE 12 is a transverse sectional view as taken along line 12—12 of FIGURE 11, looking in the direction of the arrows.

Referring now to the drawings in detail, it will be seen that there is illustrated in FIGURES 1 through 4 a house trailer, generally referred to by the numeral 10, the house trailer being illustrated in accordance with one preferred form of this invention. The house trailer 10 for the most part is of a usual construction and includes a supporting frame 11, FIGURES 3 and 5, having a forward tongue portion 12. The frame 11 is provided with a pair of longitudinal rear springs 13, FIGURE 3, which support opposite ends of a rear axle 14. The rear axle 14, in turn, operably carries rear wheels 15.

The tongue portion 12 of the frame 11, FIGURES 3 and 4, is provided with the usual trailer hitch 16. In addition, the tongue portion 12 has a vertically adjustable shaft 17 which supports at the lower end thereof a caster type front wheel 18 in the usual manner, and which wheel would be lowered to support the trailer front end when the latter is disconnected from the towing automobile (not shown). A hand crank 19 is provided for vertically adjusting the caster type front wheel 18 by elevating or lowering the shaft 17 on which same is mounted.

The frame 11 carries the usual trailer body 20 having a floor 21. For the most part, the trailer body 20 is of a conventional construction and only those portions of the trailer body which are different from conventional constructions will be described in detail here.

In the interior of the trailer body 20, the primary difference is that substantially all of the furnishings thereof are elevated a considerable distance above the floor 21 so as to provide storage space therebeneath for the purpose of storing a boat to be described in detail hereinafter. Certain of the furnishings, which are generally referred to by the numeral 22, are best illustrated in diagrammatic form in FIGURES 2, 3, and 4. These furnishings will, of course, include such things as the usual stove, refrigerator, cabinets, et cetera.

The trailer 10, FIGURES 1 and 2, being intended to carry a boat therein, has a body 20 which is provided with a special ramp type, rear exit door. In addition, the body 20 will also be provided with a personnel door 26. This personnel door may be placed in the trailer body at any suitable point, such as at the rear thereof, as desired. It is obvious that many boat exit door and personnel exit door combinations can be provided. However, a preferred arrangement of doors is illustrated in the drawings.

In the preferred embodiment of the invention, the trailer body 20 is provided with a boat exit door 23 having lower horizontally disposed hinges 24 substantially even with the floor 21 of the body 20, FIGURES 2, 3 and 5. The boat exit door 23 is normally held in a closed position by a latch 25 and is swingable downwardly into engagement with the ground to form a ramp to facilitate the loading and unloading of the boat with respect to the trailer body 20. A personnel door 26 is disposed immediately adjacent the boat exit door 23 and is of a full height as compared to the relatively shorter height of the boat exit door. The personnel door 26 is provided with vertically aligned hinges 27 preferably disposed remote from the boat exit door 23.

The trailer body 20 also includes a fragmentary door frame member 28, FIGURES 1, 2 and 5, which is provided at the upper end thereof with a horizontally disposed hinge 29. A lower catch 30 is provided to hold the door frame member 28 in its operative position. The door frame member 28 is disposed between adjacent portions of the boat exit door 23 and the personnel door 26.

As is clearly shown in FIGURES 2 and 4, the boat exit door 23 is provided with an extension 31. The extension 31 is hingedly connected to the side of the boat exit door 23 by hinges 32 along the edge of the boat exit door 23 disposed next to the personnel door 26. The extension 31 is swingable into the plane of the boat exit door 23 from a stored position flush against the rear surface thereof, as is best shown in FIGURE 4, to form an extension of the boat exit door 23 when the same is in the ramp position thereof, as is best shown in FIGURES 2 and 5. The outer top edge of extension 31, when in ramp position, is preferably provided with a pivotally mounted support 64, as more clearly shown in FIGURE 5. This support 64 is preferably rotatable about pivot 65 from the supporting position of FIGURE 5 to the folded position of FIGURE 4.

When it is desired to utilize the boat exit door 23 as a ramp in the loading and unloading of a boat, the personnel door 26 is first opened. The boat exit door is then swung downwardly to its ramp forming position, after which the door frame member 28 is swung to an upwardly extending position, FIGURES 2 and 5, so as to provide a completely clear, substantially full width exit opening in the rear of the trailer body 20. The extension 31 is then swung over into alignment with the opening for the personnel door 26, and support 64 turned about its pivot 65 to supporting position, so as to provide a full width boat ramp, as is shown in FIGURE 2.

The house trailer 10 is further modified in that the tongue portion 12 thereof is provided with an upstanding support 33 which carries a winch 34. A cable 35 leads from the winch 34 rearwardly through an opening 36 in the front portion of the trailer body 20. The opening is closable by means of a small plate 37, FIGURES 3, and 4, which is suitably hinged to the trailer body 20. The cable 35 may be suitably connected to a bow portion of a boat, as shown in FIGURE 3, to facilitate the loading and unloading of the boat through the rear opening boat exit in the trailer body 20.

A preferred embodiment of boat construction is illustrated in the drawings with a step 66 being preferably provided on the rear end of the boat for easy access thereinto when inside the trailer or dismounted for movement on its wheels. The boat, which is generally referred to by the numeral 38, is preferably of the double hull catamaran type and is preferably provided with a single outboard motor 39. In order that the boat 38 may be readily moved into and out of the trailer 10, as well as into and out of the water, it is provided with suitable wheel assemblies. It is desirable that the wheel assemblies of the boat 38 be of the readily convertible type for swinging into the interior of the boat without being fully disconnected from the boat in that the boat 38 will, in most instances, be used in a locale for only a short period. A desirable type of rear wheel assembly is best illustrated in FIGURES 6 and 7 of the drawings, and which includes tandem wheels 48. The use of single wheels is illustrated in FIGURES 9, 10 and 11. A rear wheel assembly, generally referred to by the numeral 40 or 40a, is secured to each side of the boat 38 along the rear portion of the hull thereof. Each rear wheel assembly 40 or 40a includes a support 41 or 41a which is preferably formed of a metal plate or rigid sheet material and is preferably provided at the upper end thereof with an elongated piano hinge 42. The remainder of the piano hinge 42 is secured, as at 43, to the upper portion or gunwale of the boat 38. If desired, the piano hinge 42 may be provided with a removable pintle 44 to facilitate the complete removal of the support 41 or 41a.

The rigid support 41, FIGURE 7, is provided with a narrow lower portion 45 which carries a longitudinal spring 46. A stub axle 47 is carried by each end of the longitudinal spring 46 and, in turn, each stub axle 47 carries a wheel 48 having a flat crowned tire 49 mounted thereon. Although the tires 49 will usually be of sufficient size to provide adequate support for the boat 38, in the case of loose sandy ground or the like, a removable endless load bearing belt 50 may be entrained over the two adjacent tires 49 of the tandem wheel assembly to increase the load supporting capabilities of each rear wheel assembly 40.

It is to be noted that the rigid support 41 is provided with an intermediate, longitudinally extending rib 51, FIGURE 6. The rib 51, as is best shown in FIGURE 7, is aligned with a generally T-shaped rib 52 on the side of the hull of the boat 38. A channel-shaped, substantially C-section spray rail 53 is carried by the rib 52, which rib 52 is interrupted to receive the support 41 and its aligned rib 51. The spray rail 53 is longitudinally slidable on the rib 52 and is engaged over the rib 51 to hold the support 41 alongside the side of the boat 38, as is best shown in FIGURE 6. When it is desired to swing the wheel assembly 40 into the interior of the boat 38, as is shown in phantom lines in FIGURE 6, the spray rail 53 is slid forwardly until it clears the rib 51, after which the wheel assembly 40 is free to be swung to its stored position within the boat 38. The spray rail 53 is then, of course, moved back to its normal position during the use of the boat. As is best shown in FIGURE 7, the spray rail 53 may be provided with a resilient spring assembly 54 frictionally clamping opposite edges of the rib 52 so as to resist the accidental longitudinal movement of the spray rail 53 with respect to the rib 52.

Although the rear wheel assemblies 40 may be swung up into the boat 38 in stored positions during the use of the boat, when the boat is to be used in one locale for an extended period of time, the pintles 44 will be removed and the wheel assemblies 40 completely removed from the boat 38.

The boat 38 also has a front wheel assembly, FIGURES 3, 8, and 9 generally referred to by the numeral 55. The front wheel assembly 55 includes a lower bracket 63 and an upper bracket 56 which is hingedly connected to the bow of the boat 38 by means of a hinge 57. Lower bracket 63, as hereinafter set forth in connection with towing boat 38, is fastened to tow bar 61 which in turn, as shown in FIGURE 8, is clampable beneath the bow of the boat by means of bolts 67 or the like. A vertically adjustable threaded shaft 58 which is threadedly carried by the bracket 56, extends through tow bar 61, and is provided with a crank 59 on its upper end to facilitate the vertical adjustment thereof. A front caster wheel assembly 60 is carried by the lower end of the shaft 58.

The boat 38 also includes, at the forward end of tow bar 61, FIGURES 3 and 9, a conventional trailer hitch 62. The tow bar 61, as previously described, is secured to lower bracket 63 and may be removably secured in conventional manner to the bow of the boat 38 such as by means of bolts 67, or the like, as diagrammatically shown in FIGURE 8. It is to be understood that the trailer hitch 62 of tow bar 61 need be provided only when it is desired to tow the boat behind a vehicle.

In the normal launching and retrieving of the boat 38, the trailer 10 will be backed down immediately adjacent to the water and the boat unloaded from the trailer and pushed into the water. The boat will be retrieved by utilizing the winch 34. On the other hand, if the trailer is to be parked a distance from the water and the water is not readily accessible to the trailer, or it is not desired to utilize the trailer in the launching of the boat, the tow bar 61, attached to the boat 38, may be connected to and the boat towed by the same vehicle (not shown) as utilized in the towing of the trailer 10. With the boat 38 being supported by both the rear and front wheel assemblies, it will be readily apparent that the boat may be manually pushed into the water when desired, and then the wheel assemblies swung into the boat where they can remain, if desired, until the boat is to be removed from the water, when they will be swung out and fastened for supporting the boat when it is pulled from the water.

Referring to FIGURES 9 and 10, it will be noted that the rear wheel assembly 40a utilizes a single wheel 48 instead of the tandem wheels shown in FIGURES 2, 3, 4 and 7. Unless the ground is very soft, single rear wheel assemblies 40a will suffice to support the boat, and particularly so now that large cross section flat profile tires 49 are readily available for use where a larger ground contacting area per tire is desired. The support 41a FIGURES 9 and 10, is similar to support 41, FIGURES 6 and 7, except that no spring is used and the stub axle 47a is rigidly fastened, as by cap screws 78, welding, or brazing, to support 41a with the tire 49 supplying the resiliency in supporting boat 38. This is a highly simplified construction which is much less costly than the tandem wheel assembly described above. The rear wheel assembly 40a on each side of the boat may be detachably held in place in any conventional manner with a preferred construction having been previously described in connection with rear wheel assembly 40.

Where a resiliently mounted single wheel assembly 40b is desired, this can be provided as shown in FIGURES 11 and 12. Here the support 41b is pivotally mounted as shown in FIGURE 9 relative to support 41a, and it is intended that the showing in FIGURE 9 be considered to also diagrammatically illustrate the mounting of rear wheel assembly 40b shown fragmentarily in FIGURE 11.

Again, referring to FIGURE 11, it will be noted that the lower end 68 of support 41b is of outturned and braced construction to which a non-round and preferably rectangular cross section open bottom female housing 69 is connected in any suitable manner, such as by welding or brazing. Closely but slidably and non-rotatably fitting into the open bottom end of female housing 69 is a male housing 70 carrying a bracket 71 on its lower end with the housing 70 and bracket 71 being fastened together in any suitable manner such as by welding or brazing.

A load carrying compression spring 72 is mounted inside telescoping housings 69 and 70, as shown in FIGURE 11, to provide resilient support for the boat 38. Housings 69 and 70 are preferably held together in telescoping relation by means of a bolt 73 carrying a cushioning compression spring 74 on its upper end below nuts 75 which may be separated from spring 74, if desired, by means of a space washer 76. A stub axle 47b is conventionally fastened to the side of bracket 71, FIGURE 11, in any suitable manner such as by welding or brazing, to rotatably support a wheel (not shown) carrying tire 49 as described in connection with the showing in FIGURE 10. This type of assembly permits ready disassembling of housings 69 and 70 for lubrication or changing of compression spring 72. Air trapped inside of housings 69 and 70 may be used as a cushioning or shock absorbing factor, although a vent 77 may be provided, if desired, to overcome this effect.

From the foregoing, it will be seen that novel and advantageous provision has been made for carrying out the desired ends. However, attention is directed to the fact that variations may be made in the trailer and boat constructions disclosed herein without departing from the spirit and scope of the invention, as herein shown and described.

Other modes of applying the principle of my invention may be employed instead of those explained, change being made as regards the sporting equipment assembly, wheel mounted boat, and combinations herein disclosed provided the means stated by any of the following claims or the equivalent of such stated means be employed.

I therefore particularly point out and distinctly claim as my invention:

1. An outdoor sporting equipment assembly, which comprises a boat having a hull, a rib on each side of said hull and extending lengthwise of same, a spray rail for each side of said hull, each of said spray rails having an endwise sliding fit with the corresponding rib on the side of said hull and being longitudinally movable thereon, a rear wheel assembly on each side of said hull, means hingedly mounting said rear wheel assemblies on the upper portion of said hull, said rear wheel assemblies having a support means with said means hingedly mounting said rear wheel assemblies on said hull being at the upper end of said support means, a rib on said support means, each of said rear wheel assemblies having at least one wheel on the lower end of said support means, said spray rail on each side of said hull engaging said rib on said support means for releasably holding said support means of said wheel assembly in fixed hull supporting position.

2. The assembly as set forth in claim 1, wherein said rib on each side of said hull is of T-shape cross section, and said spray rail is of C-shape cross section engaging said rib for endwise movement thereon.

3. An outdoor sporting equipment assembly, which consists of a boat assembly comprising a hull having a rib and a spray rail along each side, said spray rail having a sliding fit with said rib on the side of said hull and being longitudinally movable therealong, and a rear wheel assembly hinged to each side of said hull and including a support having a longitudinally ribbed portion, said spray rail engaging said ribbed portion of said rear wheel assembly and said hull rib for fixedly retaining said wheel assembly in a hull supporting position.

4. The assembly of claim 3 wherein each wheel assembly of said boat is hinged at the top of the respective hull side for swinging into the interior of said hull when released by said spray rail.

5. The assembly of claim 3 wherein said hull was a generally T-shaped rib along each side, and said spray rails are of substantially C-section channel-shape and engaged over said T-shaped rib.

6. The assembly of claim 5 wherein the assembly includes a spring means for each spray rail for holding the same in place on its respective T-shaped rib.

7. An outdoor sporting goods assembly, which comprises a boat with side rails, rear supporting means on each side of said boat, front supporting means for the front end of said boat, said front supporting means including a caster having a swivel mounting means for a wheel on the front end of said boat, axle means on the lower ends of all of said supporting means, a wheel rotatably mounted on each of said axle means in position for movably supporting said boat, a single pivot hinge means including a pintle for each of said supporting means, said hinge means having the pintle thereof on the upper ends of all of said supporting means, means fastening said hinge means on said boat with the pintle substantially at the top of said boat rail and in position to facilitate folding of rear rear supporting means into said boat and said front supporting means with its caster wheel back over the bow of same, said rear supporting means hinge being substantially parallel to said boat rails and limiting movement of said rear supporting means to movement into and out of said boat while said front supporting means hinge limits movement of the assembly carrying the front caster wheel to forward and back over the top of the bow of said boat, said front supporting means having adjustable members for shifting the position of said caster relative to the front end of said boat including up and down when in boat supporting position, coacting means for releasably fastening said front supporting means to the bow of said boat in supporting and towing position, and coacting means carried by the rear supporting means and the outer sides of said boat for releasably anchoring said rear supporting means to the side of said boat in boat supporting and towing position, a rib on each side of said hull and extending lengthwise of same, a rib on said rear support means, a spray rail for each side of said hull, each of said spray rails having an endwise sliding fit with the corresponding rib on the side of said hull and being longitudinally movable thereon, said spray rail on each side of said hull engaging said rib on said support means for releasably holding said support means of said wheel assembly in fixed hull supporting position.

8. An outdoor sporting equipment assembly as set forth in claim 7 wherein said wheel carrying axle means on the lower end of said rear supporting means on each side of said boat is in the form of tandem wheels with each set of said tandem wheels having an endless load bearing belt entrained thereover to facilitate the supporting of said boat in sandy and like ground, said tandem wheels each including a tire having a slight crown wherein said endless belt is retained thereon.

References Cited

UNITED STATES PATENTS

| | | | |
|---|---|---|---|
| 2,421,671 | 6/1947 | West | 9—1 |
| 2,578,376 | 12/1951 | Smith | 9—1 |
| 2,847,136 | 8/1958 | Neff | 9—1 |
| 2,852,266 | 9/1958 | Wagner | 9—1 |
| 2,863,159 | 12/1958 | Bear | 9—1 |
| 2,929,079 | 3/1960 | Totten | 9—1 |
| 2,999,252 | 9/1961 | Norrby | 9—1 |
| 3,154,799 | 11/1964 | Jalowiecke | 9—1 |
| 3,158,881 | 12/1964 | Clausen | 9—1 |
| 3,193,321 | 7/1965 | Rose | 296—23 |

BENJAMIN HERSH, *Primary Examiner.*

C. C. PARSONS, *Assistant Examiner.*

UNITED STATES PATENT OFFICE
CERTIFICATE OF CORRECTION

Patent No. 3,348,858            October 24, 1967

Floyd R. Rose

It is hereby certified that error appears in the above numbered patent requiring correction and that the said Letters Patent should read as corrected below.

Column 8, line 27, for "was" read -- has --; line 47, for "rear", first occurrence, read -- said --; column 10, line 7, for "Jalowiecke" read -- Jalowiecki --.

Signed and sealed this 19th day of November 1968.

(SEAL)
Attest:

Edward M. Fletcher, Jr.
Attesting Officer

EDWARD J. BRENNER
Commissioner of Patents